(12) United States Patent
Toyoguchi et al.

(10) Patent No.: US 6,299,946 B1
(45) Date of Patent: Oct. 9, 2001

(54) METHOD OF MANUFACTURING A RECORDING MEDIUM

(75) Inventors: Takashi Toyoguchi; Chiaki Okuyama, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/520,284

(22) Filed: Mar. 6, 2000

(30) Foreign Application Priority Data

Mar. 17, 1999 (JP) .................................................. 11-072666

(51) Int. Cl.[7] .................................................. C08J 7/04
(52) U.S. Cl. .......................... 427/512; 427/130; 427/131; 427/132; 427/385.5; 427/407.1; 427/535; 427/558; 427/559
(58) Field of Search .................... 427/130, 131, 427/132, 512, 535, 558, 559, 385.5, 407.1

(56) References Cited

U.S. PATENT DOCUMENTS 5,237,917 * 8/1993 Traut et al. .
5,399,758 * 3/1995 Miura et al. .

FOREIGN PATENT DOCUMENTS

| 4006624 | 1/1992 | (JP) . |
| 7326042 | 12/1995 | (JP) . |
| 9022528 | 1/1997 | (JP) . |
| 10209734 | 8/1998 | (JP) . |

* cited by examiner

Primary Examiner—Bernard Pianalto

(57) ABSTRACT

A method of manufacturing a recording medium includes the steps of: a) providing an underlayer on a substrate; b) providing a magnetic layer on the under layer; c) providing a protection layer of amorphous carbon on the magnetic layer; and d) providing a lubrication layer of fluorine on the protection layer, the lubrication layer including a bonding layer part which is strongly bonded to the protection layer and a mobile layer part which is not strongly bonded to the protection layer. The method further includes the steps of: e) implementing a UV curing process on the surface of the protection layer between the step c) and d), so that a ratio of the bonding layer part in the lubrication layer is increased.

8 Claims, 7 Drawing Sheets

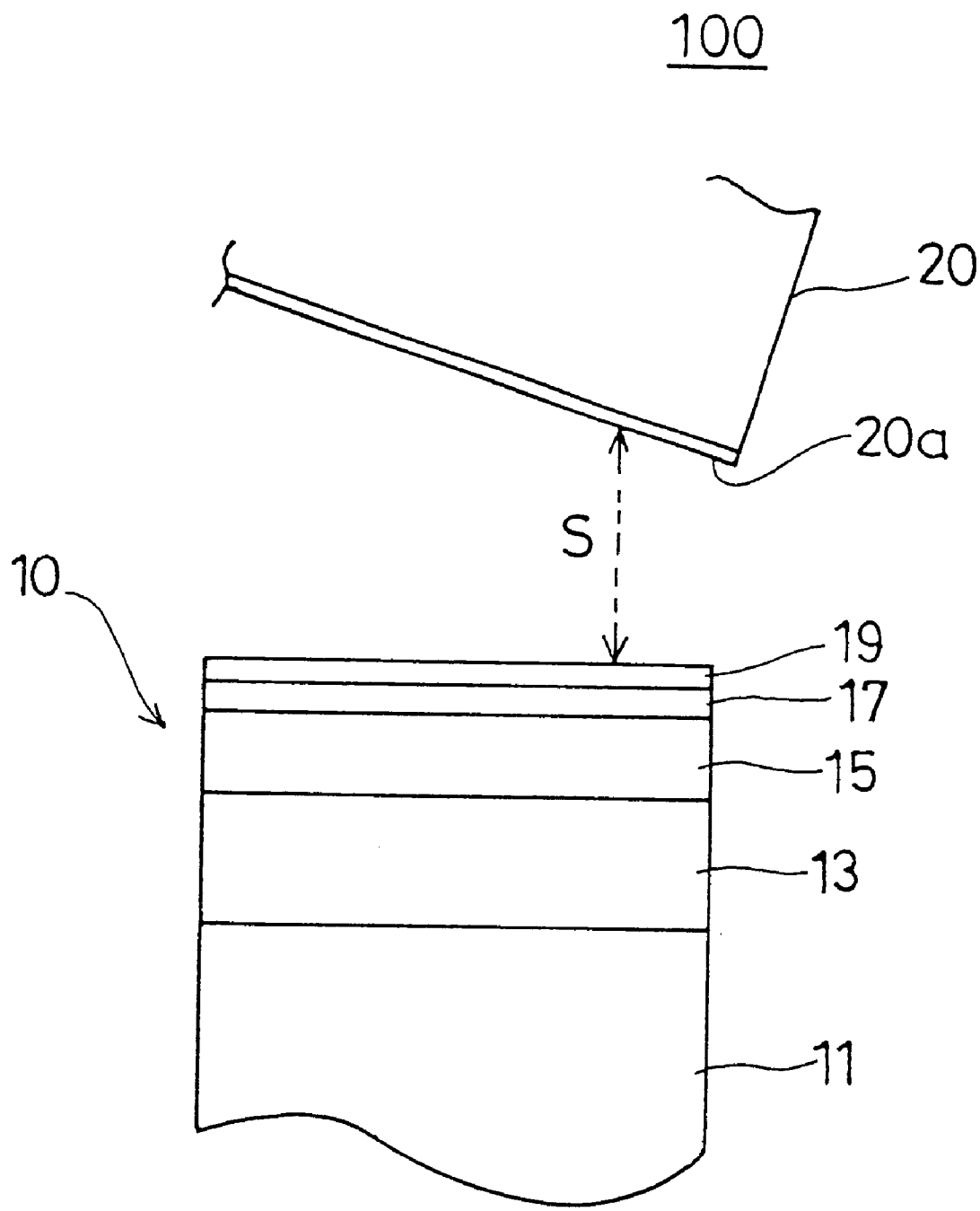

METHOD OF MANUFACTURING A RECORDING MEDIUM

BACKGROUND OF THE INVENTION

1. Field of the Invention

The present invention generally relates to a method of manufacturing a recording medium. The present invention particularly relates to the method of manufacturing a magnetic recording medium for use in a magnetic recording and reproduction device serving as external storage device of computers.

2. Description of the Related Art

Recently, there is an increasing need for high-density recording in magnetic storage devices known as hard-disk device. In such a hard-disk device for high-density recording, it is necessary to reduce the magnetic spacing, which is a space formed between a magnetic head provided in the magnetic disk device and the surface of a magnetic disk serving as a recording medium in the main body of the hard-disk device, as much as possible. In other words, the gap between the magnetic head and the magnetic disk surface, scanned by the magnetic head, should be as small as possible. Recently, a spacing of about 50 nm or less is used.

FIG. 1 is a schematic diagram showing a magnetic disk device 100 including a magnetic head 20 and a rotating magnetic disk 10 of the related art. FIG. 1 is illustrated in an enlarged view, so as to clearly show the layered structure of the magnetic disk 10 and a magnetic spacing S.

Referring to FIG. 1, the magnetic disk has a structure including a substrate 11, an underlayer 13 formed on the substrate 11, and a magnetic layer 15 formed on the underlayer 13. A protection layer 17 of amorphous carbon is provided further on the magnetic layer 15. Further, a lubrication layer 19 of a fluorocarbon compound is formed on the protection layer 17.

As described above, in such a hard-disk device designed for high-density recording, there is a need to reduce the size of the magnetic spacing S as much as possible. On the other hand, such a reduction of the spacing S invites an increased chance that the magnetic head 20 hits the surface of the magnetic disk 10 during the operation of the hard-disk device 100. In view of the situation noted above, it is preferable to smooth the surface of the magnetic disk 10 as much as possible. Further, technical improvement is required, such as a reduction in thickness of the magnetic disk 10.

The magnetic disk device 100 described above generally operates in accordance with the so-called contact-start-stop (CSS) mode. With the CSS mode, a lift surface 20a of the magnetic head 20 contacts and slides over the surface of the magnetic disk 10 at the start or stop phase of rotation of the magnetic disk 10. On the magnetic disk 10, for the CSS-mode operation, it should be noted that friction and abrasion of the disk surface primarily depends on the nature of the protection layer 17 and the lubrication layer 19. Thus, the protection layer 17 and the lubrication layer 19 are important for maintaining the reliability of the magnetic disk device 100. Particularly, due to the recent trend of technology to reduce the spacing between the floating magnetic head and the magnetic layer 15 carrying a high-density record of information, there is a need for maintaining stable friction and abrasion properties for the lubrication layer 19 over a longer period of time.

FIGS. 2A to 2F are diagrams showing various steps of manufacturing the magnetic disk 10 according to the related art. Referring to FIG. 2A, a non-magnetic substrate 11 of a material such as Al plated with NiP is prepared. Next, in the step of FIG. 2B, very small irregularities, or textures, are formed on the non-magnetic substrate 11. Next, in the step of FIG. 2C, a deposition process, such as a sputtering process is implemented, and an underlayer 13 of a Cr alloy, a magnetic layer 15 of a Co alloy, and a protection layer 17 of amorphous carbon are deposited consecutively on the substrate 11. Then, in the step of FIG. 2D, a pre-heat treatment is applied to the structure obtained in the step of FIG. 2C. A lubrication layer 19 of fluorocarbon compound is uniformly applied to the surface of the protection layer 17 in FIG. 2E by dipping the structure of FIG. 3D into a solution of the fluorocarbon compound. After the lubrication layer 19 has been thus formed, a heating process or UV (ultraviolet beam) curing process is implemented in the step of FIG. 2F for curing the fluorocarbon lubrication layer 19. As a result of the curing process of FIG. 2F, it should be noted that the proportion of the lubrication layer 19 bonded firmly to the surface of the protection layer 17 is increased. The part of the lubrication layer 19 bonded to the surface of the layer 17 is hereinafter referred to as a bonding layer part.

Meanwhile, when the surface of the magnetic disk 10 is entirely smooth and flat, there will be an increase in the contact area between the magnetic head 20 and the magnetic disk 10. Thus, in order to prevent a part of lubrication layer from being taken away and transferred to the magnetic head 20 under the situation noted above, it is preferable to provide the lubrication layer 19 with a small thickness of about 1 to 2 nm.

As has been described above, there have been various efforts made on the lubrication layer 19 substantially serving as the surface of the magnetic disk 10. Such efforts include reducing the thickness of the lubrication layer 19 and improving the bonding strength between the lubrication layer 19 and the protection layer 17. In relation to increases in data transfer rates between a hard disk drive and the computer, and further in relation increases in the recording densities the rotational speed of the magnetic disk 10 is also increasing. Presently, a considerably high speed of about 7,200 to 10,000 rpm is used in the advanced high-density hard disk devices. It should be noted that such high rotational speed of the magnetic disk 10 results in an increased centrifugal force. Thus, there is a tendency, in the lubrication layer 19 of the related art, for the part of the layer 19 not bonded to the surface of the protection layer 17 to undergo spin off as a result of the large centrifugal force. The proportion of the unbonded part, or a so-called mobile layer part, of the lubrication layer 19 reaches as much as 50% to 70%. As a result of the spin-off of the mobile layer part 19, the thickness of the lubrication layer 19 can be reduced to as small as only a few Ångstroms, while such an extreme thinning of the lubrication layer 19 is problematic in that a stable lubrication functions of the layer 19 cannot be guaranteed over a long period of time.

In view of the need for reducing the friction force of the magnetic head 20 against the above-described magnetic disk 10 in the CSS mode operation of the hard disk device, recent hard disk technology tends to use very small protrusions on the lift surface 20a of the magnetic head and/or on the CSS region (not shown) of the magnetic disk 10. While such a structure may be useful for reducing the friction, there arises a in that the pressure between the magnetic disk surface and the magnetic head will increase in correspondence to the contacting part as compared with the structure where the lift surface 2a and/or the CSS region are/is flat. Therefore, with the lubrication layer 19 of the magnetic disk 10 of the related art, the lubrication layer 19 may break due to the contact and sliding of the magnetic head 20. Accordingly, this poses a problem in that the protrusions may be worn down within a short period of time, thus causing an increased aberration.

In order to solve the problem described above, it is certainly possible to provide the lubrication layer 19 with an increased thickness. However, with the related art, the amount of the bonding layer part bonded to the protection layer 17, by the heating or UV curing process (see FIG. 2F), is not sufficient. In other words, there is still a considerable amount of mobile layer part included in the lubrication layer 17. This mobile layer part 8 will spin off as a result of the high-speed rotation of the magnetic disk 10, and the thickness of the lubrication layer 19 will be reduced with time, thus resulting in the problem described above. Further, the foregoing approach to increase the lubrication layer initial thickness causes other problems. For example, a part of the lubrication layer 19 may be transferred to the lift surface 20a of the magnetic head 20, or the distance between the magnetic head 20 and the surface of the magnetic disk 10 becomes too large for the desired high-density recording.

SUMMARY OF THE INVENTION

Accordingly, it is a general object of the present invention to provide a method of manufacturing a recording medium which can solve the problems described above.

It is another and more specific object of the present invention to provide a method of manufacturing a recording medium having a lubrication layer with a higher ratio of bonding layer part which is strongly bonded to a protection layer.

In order to achieve the above objects according to the present invention, a method of manufacturing a recording medium including the steps of:

a) providing an underlayer on a substrate;

b) providing a magnetic layer on the under layer;

c) providing a protection layer of amorphous carbon on the magnetic layer; and d) providing a lubrication layer of a fluorocarbon compound on the protection layer, the lubrication layer including a bonding layer part which is strongly bonded to the protection layer and a mobile layer part which is less strongly bonded to the protection layer, further comprised the steps of:

e) implementing a UV curing process on the surface of the protection layer between the step c) and d), so that a ratio of the bonding layer part in the lubrication layer is increased.

With the method described above, the ratio of the bonding layer part can be increased to greater than or equal to about 80%.

Other objects and further features of the present invention will be apparent from the following detailed description when read in conjunction with the accompanying drawings.

BRIEF DESCRIPTION OF THE DRAWINGS

FIG. 1 is a schematic diagram showing a relationship between a magnetic head and a rotating magnetic disk in the magnetic disk device of the related art.

DETAILED DESCRIPTION OF THE PREFERRED EMBODIMENT

In the following description, principles and embodiments of the present invention will be described with reference to the accompanying drawings.

Figure 2A:
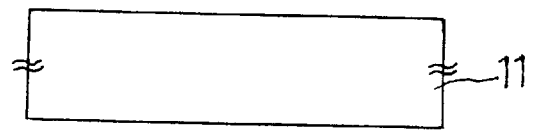
FIGS. 2A, 2B, 2C, 2D, 2E and 2F are diagrams showing steps of a manufacturing process of a magnetic disk of the related art.
Figure 2B:
Figure 2C:
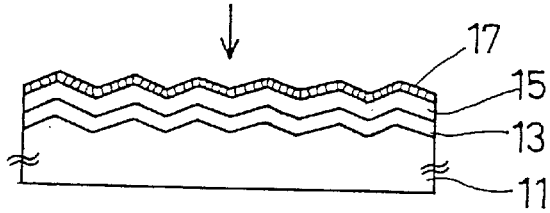
Figure 2D:
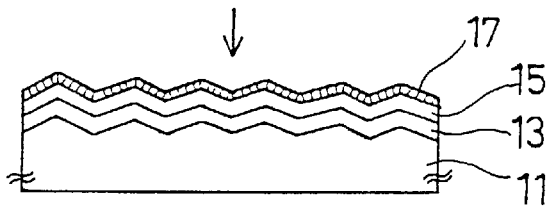
Figure 2E:
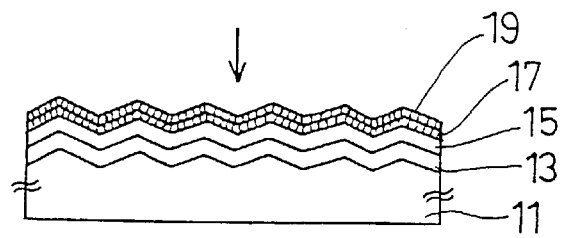
Figure 2F:
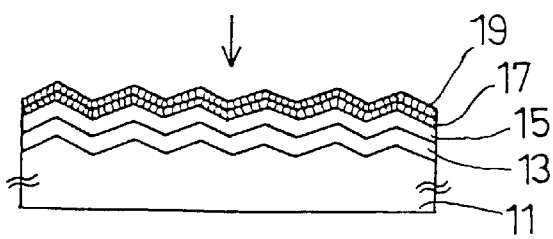
Figure 3A:
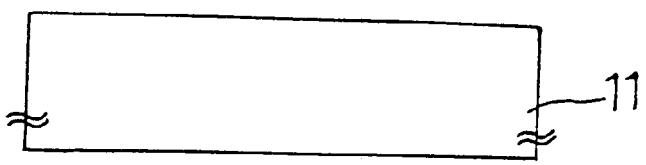
FIGS. 3A, 3B, 3C, 3D, 3E and 3F are diagrams showing steps of a manufacturing process of a magnetic disk of the present invention.
Figure 3B:
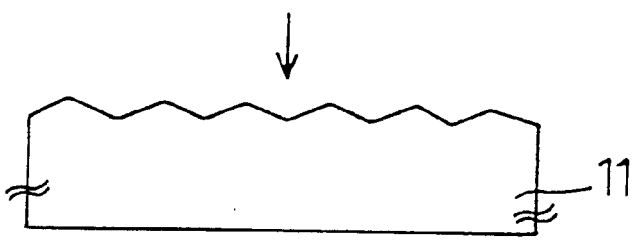
Figure 3C:
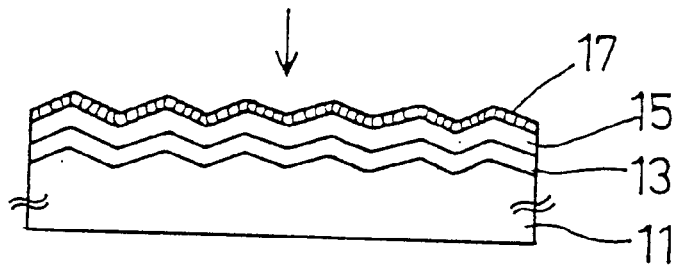

FIGS. 3A to 3F are diagrams showing the steps of manufacturing a magnetic recording medium of the present invention, wherein the steps shown in FIGS. 3A to 3C are identical to the steps shown in FIGS. 2A to 2C, and thus the steps of FIGS. 3A to 3C will not be described in detail. Also, a basic structure of the layers of the magnetic recording medium manufactured according to the present invention is similar to that of the magnetic disk 10 of the related art. Therefore, the basic structure of the magnetic recording medium will not be described in detail. Also, reference numerals used in FIG. 1 are used in the following explanation where necessary.

Figure 3D:
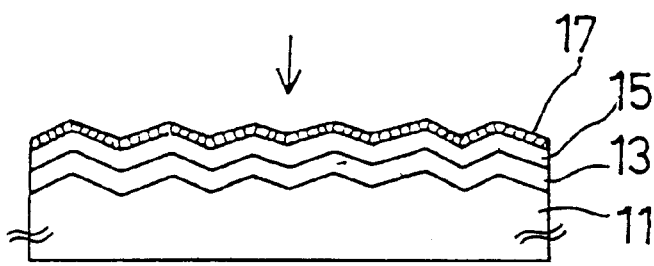
Figure 3E:
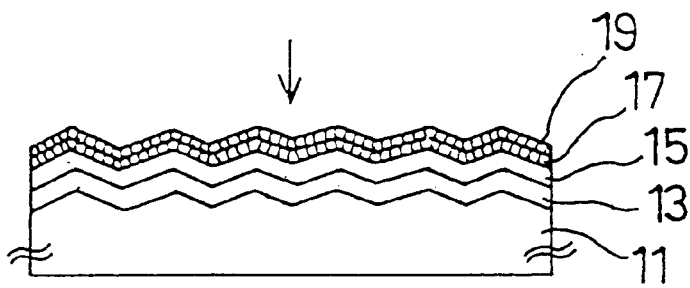

As shown in FIGS. 3A to 3C, a non-magnetic substrate 11 is formed with a texture, and an underlayer 13, a magnetic layer 15, and a protection layer 17, all having the same structure as the those of the magnetic disk 10, are formed consecutively on the substrate. After providing the protection layer 17 of amorphous carbon, as shown in FIG. 3D, a UV curing process is implemented as a pre-treatment before applying a lubrication layer 19 of a fluorocarbon compound. This UV curing process step is a characteristic step of the present invention. With such a pre-treatment, a bonding ratio of greater than or equal to about 80% can be achieved for the lubrication layer 19.

The amorphous carbon protection layer 17 may be formed, for example, of carbon hydride (carbon compound containing hydrogen) or carbon nitride (carbon compound containing nitrogen). The UV curing process may be implemented under an irradiation wavelength of 185 to 254 nm for duration of between a few seconds and up to about 600 seconds. For example, when the wavelength of 234 nm is used, the duration may be set to 600 seconds.

When the protection layer 17 has a very small thickness of, for example, less than or equal to about 10 nm, it is preferable to use a carbon hydride layer formed by plasma CVD. Sputtering is not appropriate for forming the protection layer 17 when the thickness thereof is less than or equal to about 10 nm. This is because the protection layer 17 formed by a sputtering process is in fact formed by a mere accumulation of the sputtering particles emitted from a target, and thus cannot provide the desired density and hardness for the protection layer 17. With a plasma CVD process, gaseous source compounds undergo a decomposition on the substrate surface under existence of plasma and the resultant solid phase material is bonded to the substrate surface. Thus, the density and hardness of the protection layer deposited by a CVD process will be sufficient even when the thickness thereof is reduced. The protection layer 17 thus formed by a plasma CVD process provides a good coverage on the surface of the underlying magnetic layer. As a result, the protection layer 17 will have a uniform adhesion with the lubrication layer 19 to be formed thereon.

Further, $N_2$ gas may be mixed into the sputtering gas or to the source gas of the plasma CVD process when forming the protection layer. Then, the protection layer will be formed of a carbon nitride having a good abrasive resistance.

Figure 3F:
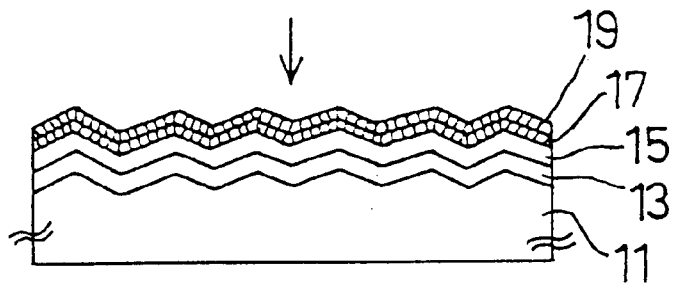

FIG. 3F is a diagram showing the step of providing the lubrication layer 19 after the UV curing step of FIG. 3D. The lubricant may be applied using a known manner such as dipping and spin-coating. The lubricant may be a fluorocarbon compound such as FOMBLIN AM3001 available from Ausimont Corp. Preferably, the lubricant is applied with a thickness of about 1 nm to 3 nm. In one example, the UV curing step is implemented with a wavelength of 234 nm for 10 minutes. A solution is prepared by diluting the lubricant FOMBLIN AM3001 to 0.04 wt % in a fluorocarbon solvent such as FLORINATE FC-77 of Sumitomo 3 M Corp. Then, the magnetic disk is dipped into the thus-prepared solution for 30 seconds. As a result, the lubrication layer 19 having a thickness of approximately 1.3 nm is obtained with a comparatively high proportion of over 80% for the bonding layer part.

Further, by implementing a surface treatment by hydrogen plasma on the surface of the protection layer 17 before the UV curing step of FIG. 3D, the dangling bonds existing on the surface of the protection layer will terminated. Thus, the surface of the protection layer will become uniform and homogeneous. Then, by implementing the UV curing step, the uniform surface is effectively activated, and the ratio of the bonding layer part with regards to the mobile layer part is increased. Also, the bonding layer part will be formed with a uniform thickness. For the case of hydrogen plasma surface treatment, the treatment may be continued for a few minutes under a $H_2$ pressure of 20 mTorr and an acceleration voltage of 1000 V.

Figure 4:
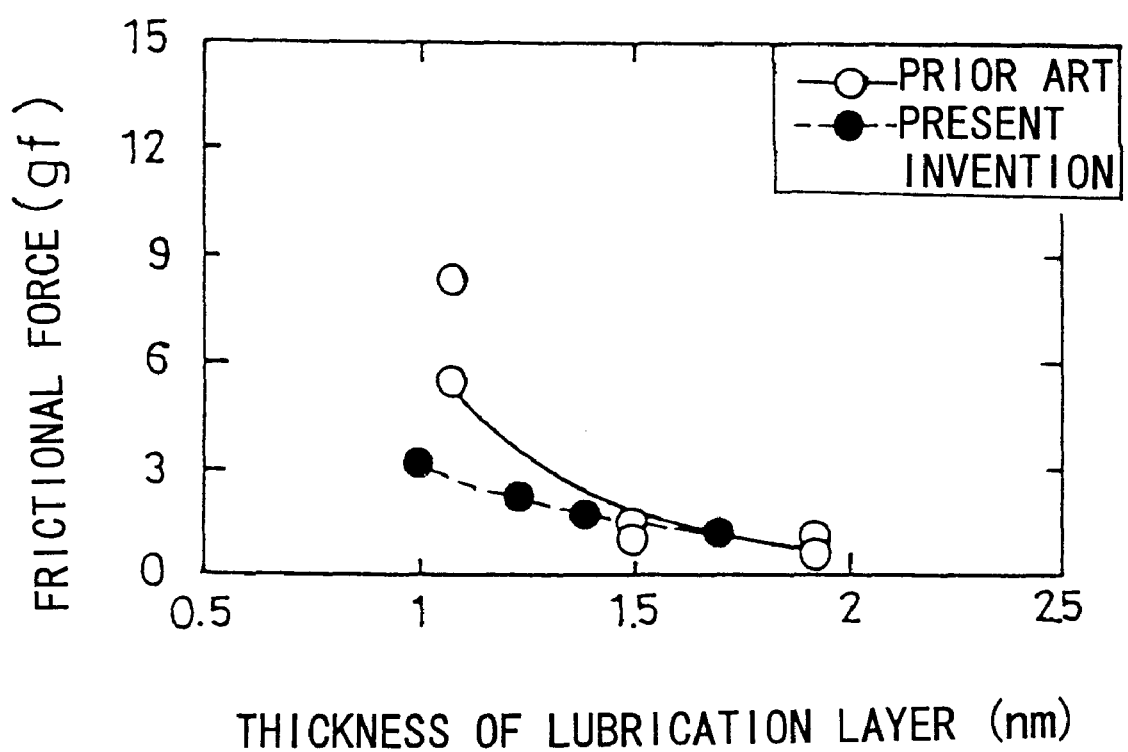
FIG. 4 is a graph showing the relationship between the friction force and the thickness of the lubrication layer for the magnetic disk of the present invention in comparison with a magnetic disk of the related art.

As shown in FIG. 3F, a heating and UV curing step may be added after the above-described lubricant applying step, as already described with reference to the related art. Then, the bonding layer part having a comparatively great thickness of as much as approximately 3 nm can be obtained. FIG. 4 shows the relationship between the friction force and the thickness of the lubrication layer for the magnetic disk of the present invention in comparison with a magnetic disk of the related art.

Referring to FIG. 4, it can be seen that a reduced frictional force is obtained with a lubrication layer having greater thickness. Also, in order to improve the slide resistance, FIG. 4 indicates that the lubrication layer having a greater thickness is preferable. However, in the related art, since the ratio of the mobile layer part in the lubrication layer is comparatively high, the thickness of lubrication layer has been limited to only about 2 nm. Otherwise, the lubrication layer may be transferred to the magnetic head. On the other hand, considering the reduction of the thickness of the lubrication layer due to spin-off, the lubrication layer of the related art requires a minimum thickness of about 1 nm.

With the present invention, an improved bonding ratio is obtained for the lubrication layer as noted above, and the transferring problem of the lubrication layer to the magnetic head can be mitigated. In the present invention, the lubrication layer can have a maximum thickness of about 3 nm and a minimum thickness of less than or equal to about 1 nm. Thus, the present invention enables to use a broader range of thickness for the lubrication layer covering he magnetic disk surface.

Also, by implementing the UV curing process to the surface of the protection layer before forming the lubrication layer thereon, the bonding ratio in the lubrication layer after forming the lubrication layer is remarkably improved. In case a higher bonding ratio is desirable, an after treatment may be implemented after forming the lubrication layer. A UV-treatment before forming the lubrication layer does not always result in the state where all the functional groups at the ends of the lubricant molecules in the lubrication layer are bonded to the surface of the protection layer. That is to say, the surface will not be covered entirely with the functional groups bonding thereto. Now, if and after treatment is implemented following the lubricant applying process, in other words the process of forming the lubrication layer, a further part of the mobile layer part may be transformed into the bonding layer part. Thus, the bonding ratio is further improved.

Another example of the present invention will be described with reference to FIGS. 5A and 5B. This example relates to a pre-treatment implemented before applying the lubricant. In this example, the UV curing operation is implemented only to the CSS region.

Figure 5A:
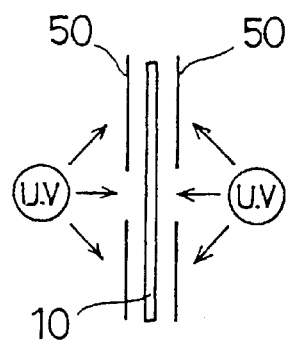
FIGS. 5A and 5B are diagrams respectively showing the exposure of the magnetic disk in the step of FIG. 3D and the dipping of the magnetic disk in the step of FIG. 3E.

As shown in FIG. 5A, the UV curing operation is implemented using a shielding plate 50 covering a part of the magnetic disk 10 except for the CSS region formed at the central part of the magnetic disk 10. Then, as shown in FIG. 5B, the lubricant is applied by, for example, dipping the disk 10 into a solution containing the lubricant component. Thus, only the CSS region will have a comparatively high bonding ratio. Therefore, as shown in an enlarged view encircled by dashed line in FIG. 5B, the bonding layer part B of the CSS region will have a greater thickness than the outer region D of the magnetic disk 10. Therefore, a friction and abrasion problem will be reduced since the contact and sliding operations of the magnetic head 20 take place primarily in the CSS region, which now has a greater thickness for the lubrication layer.

On the other hand, at the outer recording region D, the thickness of the lubrication layer will be reduced since the mobile layer part M is splashed off due to the spin-off effect. However, in practice, this is preferable for high-density magnetic recording and reproduction, since the spacing S defined in FIG. 1 is reduced and the resolution of magnetic recording is improved as a result. Further, in view of the fact that the magnetic head 20 is lifted off from the surface of the magnetic disk 10 during the operation of the magnetic recording and reproducing device, such a thinning of the lubrication layer due to the splash of the mobile layer part M due spin-off, does not cause a material problem.

In this example, it is also effective to apply a UV curing process exclusively to the CSS region (as shown in Fig, 3F) as an after-treatment process.

A further example of the present invention will be described with reference to FIGS. 6A to 6C. The present example includes the above-described process of increasing the ratio of the bonding layer part and further includes a step of positively removing the residual mobile layer part.

Figure 5B:
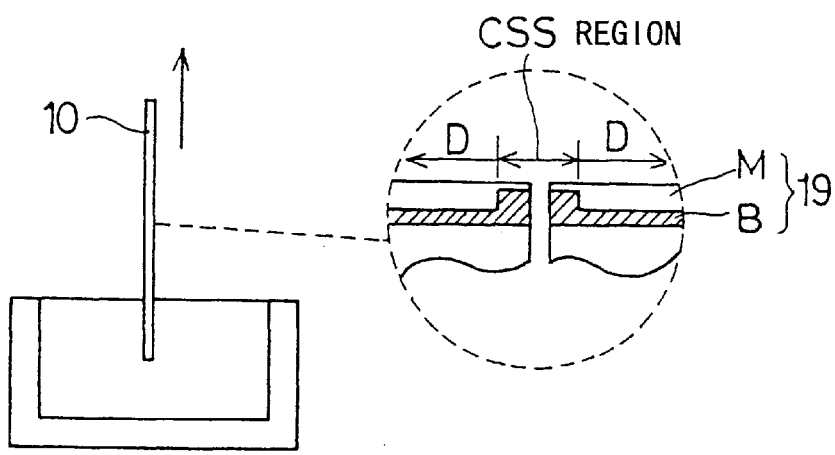
Figure 6A:
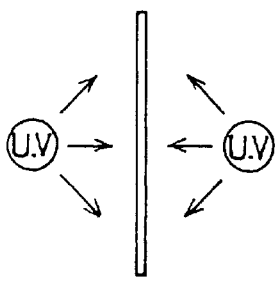
FIGS. 6A, 6B and 6C are diagrams respectively showing the exposure of the magnetic disk, the dipping of the magnetic disk and the removing of the mobile layer part.
Figure 6B:
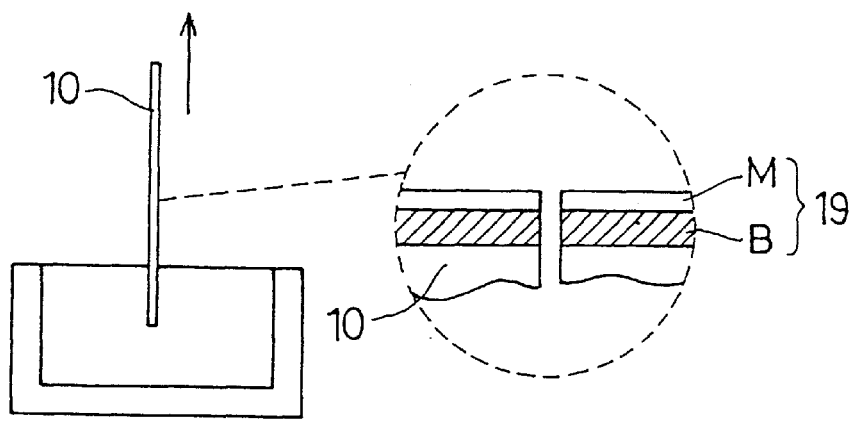
Figure 6C:
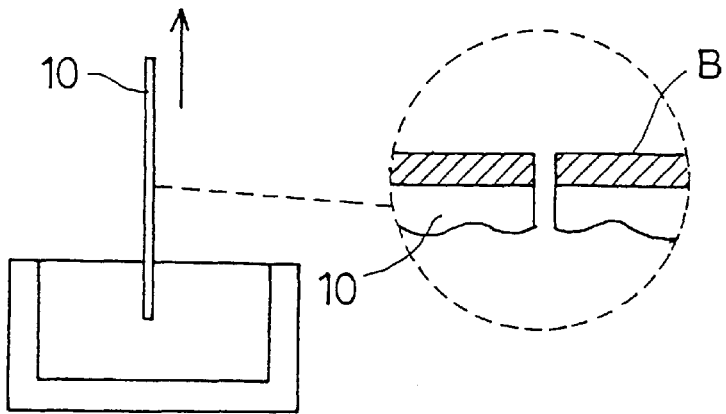

FIGS. 6A to 6C are diagrams showing a manufacturing process of the magnetic disk 10, wherein FIG. 6A represents a step of implementing the UV curing process before applying the lubricant. FIG. 6B, on the other hand, is a step of applying the lubricant to form the lubrication layer 17. A further UV curing process may be implemented after applying the lubrication layer 17, so as to increase the proportion of the bonding layer part in the lubrication layer 17. Further, as shown in FIG. 6C, the magnetic disk 10 is dipped into a fluorocarbon solution. As a result of the process depicted in FIG. 6C, the mobile layer part M is removed, and the bonding layer part B alone is left on the magnetic disk 10. In FIGS. 6B and 6C, enlarged views encircled by dashed line show a part of the lubrication layer 19 of the magnetic disk 10 in a similar manner to FIG. 5B.

The manufacturing method of the present embodiment can be applied also to the process shown in FIGS. 5A and 5B, in which the bonding layer part is formed with higher proportion in the CSS region. The mobile layer part M will be removed from the magnetic disk 10 from the state shown in FIG. 5B, so that substantially the bonding layer part B alone remains on the magnetic disk 10. Moreover, the lubrication layer 19 will be formed such that the CSS region has a greater thickness than in the outer part.

The magnetic disk manufactured by the above-described processes has a high wear-resistance at the CSS region. Also, even if the magnetic head accidentally comes into contact with the magnetic disk at the recording region, the mobile layer part will not be transferred onto the magnetic head. Thus, a reliable recording medium is obtained.

Figure 7:
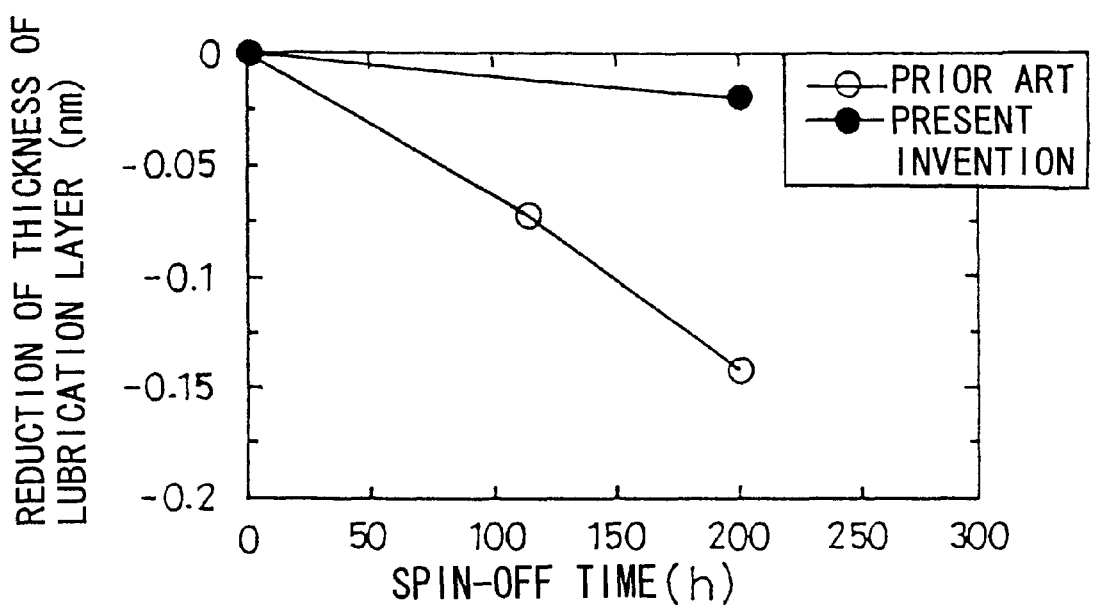
FIG. 7 is a graph showing a relationship between time and the rate of reduction of thickness of lubrication.

FIG. 7 is a graph showing the effect of spin-off of the lubrication layer with time, which may occur when the magnetic disk is mounted in the hard disk device. It can be seen that the magnetic disk carrying the lubrication layer made by the method of the present invention has a greater proportion of the bonding layer part therein, and that the rate of reduction of the thickness of the lubrication layer is substantially smaller than that of the related art.

As explained before, FIG. 4 is a graph showing the relationship between the frictional force and the thickness of the lubrication layer. With the present invention, an increase of the frictional force is comparatively less even when the lubrication layer has a small thickness of about 1 nm. This preferable effect may be caused by the bonding between the lubrication layer and the protection layer covering the surface of the magnetic disk being maintained during the use of the hard disk device. On the other hand, in the case of the related art, the frictional force rises steeply when the thickness of the lubrication layer is decreased to about 1 nm. This undesirable effect may be caused by the fact that a comparatively great proportion of the mobile layer part is splashed off as is signified by the very small thickness of the lubrication layer. FIG. 4 also shows that the frictional force decreases as the thickness of the lubrication layer is increased. Therefore, it can be easily understood that the manufacturing method of the present invention is advantageous, as a comparatively great thickness can be maintained for the bonding layer part.

As has been described above, according to the manufacturing method of the present invention, a recording medium can be obtained in which the amount of the mobile layer part is minimized. In the related art, the mobile layer part in the lubrication layer may be transferred to the lift surface of the magnetic head. Also, the mobile layer part may cause an accumulation during the CSS mode operation of the magnetic head and the magnetic disk. However, such drawbacks can be prevented with the present invention.

Also, the recording medium made by the manufacturing method of the present invention has a higher proportion of the bonding layer part than that of the related art. Also, only a desired region of the magnetic disk can be provided with a bonding layer part of a comparatively great thickness. Therefore, the magnetic disk can be used in combination with a magnetic head provided with minute protrusions on the lift surface for preventing the adhesion of the magnetic head to the magnetic disk. Alternatively, the magnetic disk can be provided with a zone texture provided with minute protrusions in the CSS region for reducing the friction and abrasion and further for preventing the adhering problem.

With such a structure provided with minute protrusions, since the contact area is reduced, the pressure between the surface of the magnetic disk and the magnetic head is tend to be increased. Therefore, in the related art, there was in that the lubrication layer breaks due to the contact and sliding of the magnetic head.

In the case of the magnetic recording medium made according to the present invention, the reduction of the thickness of the lubrication layer due to the spin-off of the mobile layer part can be successfully prevented. Also, a comparatively large thickness of the bonding layer part is maintained in the CSS region of the magnetic disk. Therefore, the magnetic disk manufactured according to the manufacturing process of the present invention is particularly advantageous when applied to such a structure provided with miniature protrusions.

Further, the present invention is not limited to these embodiments, but variations and modifications may be made without departing from the scope of the present invention.

The present application is based on Japanese priority application No. 11-72666 filed on Mar. 17, 1999, the entire contents of which are hereby incorporated by reference.

What is claimed is:

1. A method of manufacturing a recording medium comprising the steps of:
   a) providing an underlayer on a substrate;
   b) providing a magnetic layer on said under layer;
   c) providing a protection layer of amorphous carbon on said magnetic layer; and
   d) providing a lubrication layer of a fluorocarbon compound on said protection layer, said lubrication layer including a bonding layer part which is strongly bonded to said protection layer and a mobile layer part which is less strongly bonded to said protection layer, further comprising the step of:
   e) implementing a UV curing process on the surface of said protection layer after said step c) and before said step d), so that a ratio of said bonding layer part in said lubrication layer is increased.

2. The method as claimed in claim 1, further comprising the step of:
   f) implementing a hydrogen plasma treatment on said protection layer before said step e).

3. The method as claimed in claim 1, wherein said step e) is implemented only on a Contact Start Stop (CSS) region of said protection layer.

4. The method as claimed in claim 3, further comprising the step of:
   g) implementing a hydrogen plasma treatment on said protection layer before said step e).

5. The method as claimed in claim 1, further comprising the step of:
   h) implementing an after treatment after said step d).

6. The method as claimed in claim 5, wherein said after treatment is a heating process.

7. The method as claimed in claim 5, wherein said after treatment is an UV curing process.

8. The method as claimed in claim 1, further comprising the step of:
   i) removing said mobile layer part after said step d).

* * * * *